May 26, 1959
J. H. POWERS
2,888,092
ELECTROSTATIC GAS FILTER
Filed Dec. 11, 1957
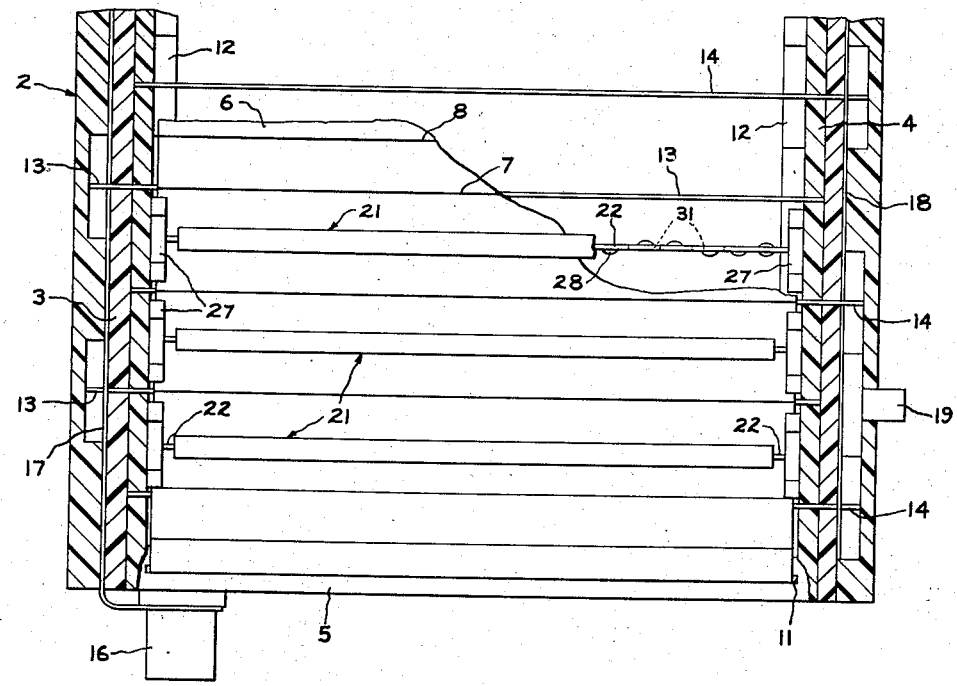
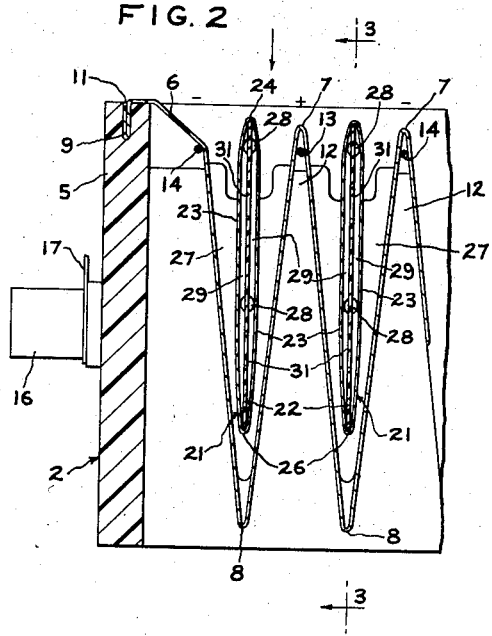
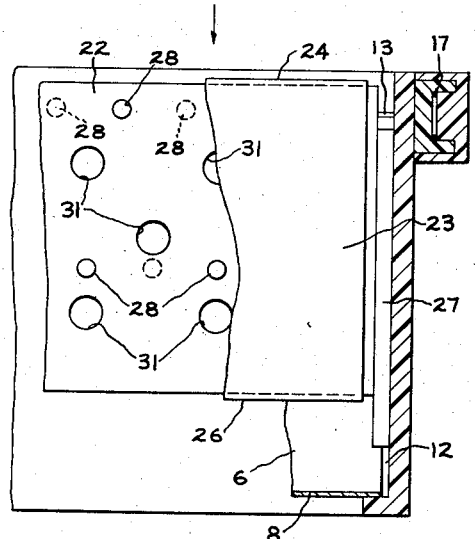
INVENTOR.
JAMES H. POWERS
BY
HIS ATTORNEY

United States Patent Office 2,888,092
Patented May 26, 1959

2,888,092

ELECTROSTATIC GAS FILTER

James H. Powers, Middletown, Ky., assignor to General Electric Company, a corporation of New York Application December 11, 1957, Serial No. 702,051

4 Claims. (Cl. 183—7)

The present invention relates to an electrostatic gas filter of the type including a folded dielectric filter medium extending across the gas stream and is more particularly concerned with an improved filter of this type, including a collector element for increasing the collecting efficiency of the filter as well as making it possible to utilize an electrostatic field of substantially higher intensity than the electrode spacing would ordinarily permit without danger of disruptive arcing and the resultant creation of ozone.

An electrostatic filter of the type which the present invention is concerned is illustrated in my Patent No. 2,814,355, issued November 26, 1957, and my application S.N. 633,499, filed January 10, 1957, now Patent No. 2,864,460, and assigned to the same assignee as the present application. In such a filter, the adjacent pleats of an accordion-folded dielectric filter medium disposed across the path of a gas stream have electrostatic charges of opposite polarities or of different magnitudes induced thereon. A plurality of parallel electrodes on the downstream side of the filter medium and disposed closely adjacent each of the upstream ridges thereof, are connected to sources of different electrical potential and induce an electrostatic charge of opposite polarity or of different magnitude upon adjacent pleats of the filter medium. Alternate electrodes are connected to a source of high D.C. electrical potential and the intermediate electrodes are connected to ground potential. The electrodes create an electrical field, the maximum intensity of which is in the plane of the electrodes or approximately in the plane of the upstream facing ridges of the filter medium.

A particle carried by the air stream into the electrical field between the adjacent pleats of the filter medium becomes electrostatically charged and is attracted to one side of the filter medium where it attains an electrical charge of the same magnitude and polarity as that particular portion of the filter medium. If the particle does not become trapped in the fibrous structure of the filter medium, it is then repelled from the filter medium and attracted to a pleat of opposite polarity. The charged particle is attracted alternately back and forth across the area between the adjacent pleats until it becomes embedded within the fibrous structure of the filter medium. Thus, the particle is influenced by a force which opposes that of the air stream and which reduces the possibility that the particle may be carried through the filter medium without becoming trapped therein. While this type of filter is especially effective in removing from a gas stream a substantial percentage of the particles having a diameter of one micron size or smaller, and in fact substantially all of the particles which normally pass through the spaces between the fibers of an uncharged filter medium, it has been found that, due to the forces of the air stream, a certain percentage of the particles are swept on through the fibrous structure of the filter medium without becoming entrapped therein and some particles, previously entrapped in the fibers of the medium are freed by the air stream and carried on through the filter. The present invention is based on the discovery that the number of particles passing through the filter medium under the forces of air stream can be substantially reduced by the provision of an additional collector area through which there is no appreciable flow of air.

Accordingly, it is an object of the present invention to provide an improved electrostatic filter having an additional collector area thereon which area does not have any appreciable air flow therethrough.

It is another object of the present invention to provide an electrostatic filter having an additional collector area disposed advantageously thereon to take maximum advantage of the electrical field while still presenting very little additional resistance to the air stream.

It is a further object of the present invention to provide an electrostatic filter having particle collecting members so arranged as to prevent electrical arcing between the electrodes of the filter.

Further objects and advantages of the invention will become apparent as the following description proceeds, and the features of novelty which characterize the invention will be pointed out with particularity in the claims annexed to and forming a part of this specification.

In accordance with the present invention, there is provided an electrostatic filter for filtering particles from a gas stream comprising an accordion-folded filter medium of dielectric fibrous material extending across the path of the gas stream and having its pleats or ridges alternately facing upstream and downstream. A plurality of electrodes are arranged on the downstream side of the filter medium with the electrodes arranged within the upstream facing pleats of the filter medium. The electrodes within adjacent upstream facing pleats are connected to sources of electrical voltage of opposite polarity thereby creating an electrostatic field between adjacent upstream facing pleats of the filter medium. A plurality of collector members are employed to provide additional collecting surfaces between the upstream facing pleats of the filter medium. A collector member is positioned in the electrostatic field established between two adjacent pleats with members so arranged that its sides are approximately parallel with the gas stream thereby reducing its resistance to the flow of gas. In order to capture particles in the gas stream at least the sides of the collector members are formed of a porous fibrous material to entrap charged particles in the gas stream, which are being moved transversely to the air stream under the influence of the electrical field.

As a further aspect of the invention, at least that portion of each collector member directly within the plane of the electrodes, is formed of a dielectric material which serves the purpose of insulating the separate electrodes from each other thereby permitting a greatly increased potential difference between the electrodes and thereby increasing the electrostatic field produced by the electrodes.

For a better understanding of the invention, reference may be had to the accompanying drawing in which:

Fig. 1 is a plan view of a portion of the electrostatic filter having the filter medium broken away to show the remaining structure of the filter;

Fig. 2 is a cross sectional elevation view of a portion of the electrostatic filter of Fig. 1 showing the arrangement of the filter medium and the electrode construction with the collector elements arranged between the adjacent pleats of the filter; and Fig. 3 is a view taken along line 3—3 of Fig. 2 showing a collector element with its fibrous collecting surface partially removed to illustrate the specific configuration of the dielectric plate.

Referring now to Figs. 1 and 2 of the drawing there is shown an electrostatic gas filter comprising an insulating frame member 2 having opposed side walls 3 and 4 and a pair of opposite ends, one of which is illustrated by the reference numeral 5. The side walls 3 and 4 support the ends of a plurality of electrodes arranged in parallel, spaced relationship across the frame member. A dielectric filter medium 6 comprising one or more sheets of fibrous material folded into an accordion or zig-zag folds and having alternately facing upstream and downstream ridges or pleats 7 and 8, respectively, is at least partially supported by the electrodes and is arranged to fill the internal area within the frame member 2. As may best be seen in Fig. 2, the filter sheet is anchored by insertion of its opposite edge portions into suitable slots, such as is shown by the edge portion 9 inserted in the slot 11 in the end 5 of the frame member. The other or side edges of the filter medium are supported by a plurality of triangular shaped projections 12 formed upon the side walls 3 and 4. In Fig. 1, it will be seen that the filter medium entirely overlies the electrodes which are disposed across the frame member 2. As may be seen by the arrow in Fig. 2, which represents the direction of air flow through the filter, the electrodes are on the downstream side of the filter medium 6 during the operation of the filter and are substantially encompassed by the pleats of the filter medium.

The electrode arrangement comprises a first series of electrodes 13 and a second series of electrodes 14 which, in operation of the filter, are maintained at different potentials or opposite polarities. For example, one set or series of electrodes such as electrodes 13 are charged with a high voltage while the other set 14 is grounded, as is illustrated by the plus or high potential electrodes and the negative or ground electrode in Fig. 2. By this arrangement, in which adjacent electrodes are at different electrical potentials, an electrical field is created between adjacent electrodes which has its highest intensity in the area directly therebetween or substantially in the plane of the upstream facing ridges 7. The pleats which enclose the electrode members are referred to in the specification and claims as the "upstream facing pleats" and comprise the upstream ridges 7 and those portions or sides of the filter medium connecting thereto and diverging in the downstream direction. In other words as may best be seen in Fig. 2, an "upstream facing pleat" consists of all of the filter medium included between two adjacent downstream facing ridges 8.

Because of the electrical field established between adjacent electrodes, each pleat of the filter medium 6 has an electrostatic charge induced thereon. As can be seen in Fig. 2, all of the upstream facing ridges which are adjacent the high voltage series of electrodes 13 have a high electrostatic potential induced thereon. All of the upstream facing ridges encompassing the ground electrodes 14 (only one of which is shown in Fig. 2) are at a low or ground potential. Any point on the filter medium between two adjacent upstream facing ridges, therefore, has an electrostatic potential induced thereon which is of an intensity somewhere between that of the adjacent upstream facing ridges, depending upon the distance of that particular point from the charging electrodes.

The electrodes 13 and 14 are supported in the opposite side walls 3 and 4 by a plurality of holes in the side walls. As can best be seen in Fig. 1, all of the electrodes 13 in the first series of electrodes have end portions which protrude a short distance through the side wall 3 and, similarly, all of the electrodes 14 of the second series of electrodes have end portions which protrude a short distance through the side wall 4. The protruding end portions of the electrodes 13 and 14 respectively are suitably connected to sources of electrical potential of differing magnitudes or polarities. Thus, as can be seen in Fig. 1, the end portions of the electrodes 12 are all connected to the high voltage terminal 16 by the spring wire connector 17. All the end portions of the series of electrodes 14 are connected by a similar spring wire connector 18 which is, in turn, connected to the ground terminal 19. During the operation of the electrostatic filter, the high voltage terminal 16 is in electrical connection with a suitable source of high voltage direct current and the low voltage terminal 19 is connected to ground.

Due to the continual flow of the air stream and the pressure differential on opposite sides of the filter medium 6, a small percentage of the particles in the air stream are swept on through the filter medium, even though the electrical field may have reduced their original velocity or even caused them to become trapped for a short period in the fibrous structure of the filter medium. As will be hereinafter described, the present invention relates to the provision of collector members arranged between the pleats of the filter medium and having a collecting surface thereon through which there is no substantial or continuous flow of air.

A plurality of collector members 21 are arranged on the upstream side of the filter medium 6 between the electrodes encompassed within the adjacent pleats. In the illustrated embodiment of the invention each of these members is in the form of a thin dielectric plate 22 having its sides arranged substantially parallel to the direction of air flow. The plates 22 may be formed of any dielectric material such as glass, nylon, cardboard, or any substance having a high resistance to electrical conductivity but which does not effectively distort or interrupt the electrical field produced by the adjacent electrodes. At least the side portions of these plates are fitted with a porous collecting material 23 having a fibrous structure for capturing and removing particles from the air stream. This material in a tested filter, was of the same type as that used for the filter medium 6. In the illustrated embodiment of the invention, the fibrous material 23 is wound upon or envelopes the plate 22 thereby providing a sleeve of fibrous material entirely around the plate. Obviously, the collector material need not have any particular formation so long as it is applied to both sides of the collector member 21. For example, the body of the collector member 21, at least in the downstream portions thereof, could comprise nothing but fibrous material and the plate 22 in that portion of the member 21 could be eliminated. However, the plate 22 of the embodiment shown in the drawings adds stiffness to the collector member 21 and this prevents "fluttering" of the downstream portions of the collector.

The collector element 21 is centrally located between the electrode members 13 and 14 with the leading edge 24 of the collector member positioned upstream a short distance from the plane of the electrodes and with the trailing edge 26 extending substantially into the space between the upstream facing pleats but not touching the pleats. By this arrangement, as much surface area as possible is placed into the electrical field without restricting the flow of air between the element and the filter medium 6 too greatly. By positioning the trailing edges 26 of the members such that they do not touch the filter medium 6 the interference to the normal free movement of the air through the filter is reduced to a minimum. The collector elements 21 are supported within the frame member in the space between the adjacent pleats by a pair of V-shaped or arrow-shaped end portions 27 which slide into the triangularly shaped projections 12 and are supported in wedge fashion thereon. A further purpose of these V-shaped end portions is to hold the filter medium 6 in sealed relationship against the triangularly shaped projections 12 thus preventing any flow of air around the edges of the filter medium.

In order to increase the collecting efficiency of the collector material 23 on the side of the plate 22 and to permit a small penetration of the air flow into the area behind the porous collector material 23 on the sides of the plate 22, a plurality of beads or projections 28 may be provided on the plate to hold the collector material 23 away from the face of the plate. By means of the beads 28 the porous collector material 23 is held a short distance away from the plate thereby forming air pockets 29 between the plate and the material. This greatly enhances the filtering capacity of the collector material 23 since it permits air flow into the pockets 29 behind the porous material 23. In order to further enhance the collecting ability of the collector material 23 on the sides of the plates there are provided a plurality of holes 31 in the plate 22 for permitting the flow of air from the space on one side of the plate to the space on the other side of the plate. It has been found during operation that the air flow through the sides of the collector material 23 is insignificant when compared with the amount of air flowing through the filter medium 6 and particles which are forced into the porous material 23 on the sides of the collector members 21 have a much greater tendency to become trapped therein rather than being swept completely through the pores of the material. Air flowing through the collector material 23 is generally the resultant of swirling motion or pressure differences on the opposite sides of the plate, due to the resistance of the filter medium 6 to the air flow, rather than the direct flow of air through the material since the air entering one side of the collector element is actually opposed by the air entering the other side. Because of this, the air entering the sides of the collector element becomes more or less stationary at the center and air does not pass in any appreciable amount through the collector element. It, therefore, does not dislodge dirt particles which become entrapped in the collector material 23. As can be seen in Figs. 2 and 3 there are no air holes 31 in the area directly in line with the electrodes or directly in the plane of the electrodes. By keeping the holes a substantial distance away or downstream from the plane of the electrodes the insulating characteristics of the plate are maintained.

In a tested model of a filter not having the above described insulating and collecting members 21, in which the electrodes were spaced a distance of one half inch apart it was possible to raise the potential difference between the electrodes to approximately 5000 volts before disrupting arcing occurred. Under very humid conditions this voltage was appreciably less. In the same test model using the collector members 21 having plates 22 formed of a polystyrene plastic material, it was possible to increase the voltage difference up to 10,000 volts without obtaining disruptive discharge. This tremendous increase in potential difference or voltage also increases the electrical field between the adjacent electrodes and pleats thus greatly increasing the electrical field and thereby, the influence of the field on the particles as they enter the filter.

During the operation of the filter, because the collector members 21 are positioned in the electrical field, they have induced thereon an electrostatic charge the intensity of which is dependent upon the distance that particular portion of the member 21 happens to be from the high potential electrodes 13. Charged particles, which enter the electrical field produced by the adjacent electrodes, are propelled by the force of this field in one direction or the other transversely to the direction or air flow. If a particle is repelled away from a particular electrode as it enters the field, it soon encounters the collector material or sides 23 of the collector element 21 and, due to the combined force of the electrostatic field and the air flow, the particle is either forced into the collector material and trapped therein or it attains a charge of the same polarity and magnitude as that induced by the electrical field on that portion of the collector material 23. The particle is then attracted toward the pleat from which it had previously been repelled where it either becomes trapped by the filter medium or again attains the charge of that particular portion of the filter medium. This procedure continues until the particle is captured in the fibrous structure of the filter medium 6 or the collector material 23. Most of the particles which penetrate the collector material 23 and become trapped in the fibers of the material are retained therein since the air flow through the material is of insufficient velocity and pressure to carry them back out of the material. Uncharged particles entering the field are either directly ionized upon entering the field or attain a charge upon touching some portion of the filter medium and are then attracted and repelled back and forth between the filter medium 6 and the collector material 23 until they are captured in the same manner as outlined above.

By the present invention there has been provided an electrostatic filter having a greatly increased collecting surface area which is strategically oriented with respect to the electrostatic field of the filter and which has no appreciable, continuous air flow therethrough. The collector member of the present invention greatly increases the collecting efficiency of the filter without substantially increasing the resistance of the filter to the air flow. Furthermore, by means of the collector members, an insulating barrier is provided between the adjacent electrodes of the filter thereby allowing the utilization of a much greater potential difference between the adjacent electrodes without the accompanying danger of electrical discharge.

While in accordance with the patent statutes there has been described what at present is considered to be the preferred embodiment of the invention, it will be obvious to those skilled in the art that various changes and modifications may be made therein without departing from the invention and it is, therefore, the aim of the appended claims to cover all such changes and modifications as fall within the true spirit and scope of the invention.

What I claim as new and desire to secure by Letters Patent of the United States is:

1. An electrostatic filter for filtering particles from a gas stream comprising an accordion-folded filter medium of dielectric fibrous material extending across the path of the gas stream with the ridges thereof alternately facing upstream and downstream, said medium thereby forming a plurality of upstream facing pleats each bounded by two adjacent downstream facing ridges, a plurality of electrodes disposed in substantially the same plane on the downstream side of said medium and closely adjacent the upstream ridges thereof, one electrode disposed in each one of said upstream facing pleats of said medium and being charged at a different potential from electrodes disposed in the next adjacent upstream facing pleat of said medium and cooperating therewith to establish and maintain an electrostatic potential difference between adjacent pleats of said filter medium, a plurality of dielectric collector members, at least one of said collector members arranged between adjacent upstream facing pleats and in the electrostatic field established between adjacent electrodes with the sides of said member approximately parallel with the direction of flow of said gas stream, each collector member having sides formed of a porous fibrous material whereby charged particles in said gas srteam influenced by said electrostatic field are directed into said collector member and trapped therein.

2. An electrostatic filter for filtering particles from a gas stream comprising an accordion-folded filter medium of dielectric fibrous material extending across the path of the gas stream with the ridges thereof alternately facing upstream and downstream, said medium thereby forming a plurality of upstream facing pleats each bounded by two adjacent downstream facing ridges, a plurality of electrodes disposed in substantially the same plane on the downstream side of said medium and closely adjacent the upstream ridges thereof, one electrode disposed in each of said upstream facing pleats of said medium and being charged at a different potential from electrodes disposed in adjacent upstream pleats of said medium and cooperating therewith to establish and maintain an electrostatic potential difference between adjacent pleats of said filter medium, and a plurality of longitudinal collector members disposed on the upstream side of said filter medium in the electrostatic field between adjacent pleats, each of said collector members being formed of a thin plate of dielectric material having its trailing edge positioned upstream from said downstream facing ridge of said filter medium and its forward edge extending upstream beyond the plane of said electrodes, said plate having a porous fibrous material attached to the sides thereof whereby charged particles in said gas stream under the influence of said electrostatic field are directed into said porous fibrous material on the sides of said dielectric plate and trapped therein.

3. An electrostatic filter for filtering particles from a gas stream comprising an accordion-folded filter medium of dielectric fibrous material extending across the path of said gas stream with the ridges thereof alternately facing upstream and downstream, said medium thereby forming a plurality of upstream facing pleats each bounded by two adjacent downstream facing ridges, a plurality of electrodes disposed in substantially the same plane on the downstream side of said medium and closely adjacent the upstream ridges thereof, one electrode disposed in each one of said upstream facing pleats of said medium and being charged at a different potential from electrodes disposed in adjacent upstream facing pleats of said medium and cooperating therewith to establish and maintain an electrostatic potential difference between adjacent pleats of said filter medium, a plurality of thin collector members disposed on the upstream side of said filter medium in the electrostatic field between adjacent pleats, each of said collector members being formed of a thin plate of dielectric material arranged within the space between adjacent pleats and having its sides approximately paralleled with the direction of flow of said gas stream, said plate having its leading edge extending upstream beyond the plane of said electrodes and its trailing edge extending downstream beyond said electrodes, a porous fibrous material enveloping said plate, and projections on the sides of said plate for maintaining an air space between the sides of said plate and said fibrous material whereby particles influenced by said electrostatic field are collected and retained on said sheet of porous, fibrous material wrapped around said plate.

4. An electrostatic filter for filtering particles from a gas stream comprising an accordion-folded filter medium of dielectric fibrous material extending across the path of said gas stream with the ridges thereof alternately facing upstream and downstream, said medium thereby forming a plurality of upstream facing pleats each bounded by two adjacent downstream facing ridges, a plurality of electrodes disposed in substantially the same plane on the downstream side of said medium and closely adjacent the upstream ridges thereof, one electrode disposed in each one of said upstream facing pleats of said medium and being charged at a different potential from the electrode disposed in the next adjacent upstream pleats of said medium and cooperating therewith to establish and maintain an electrostatic potential difference between adjacent pleats of said filter medium, a plurality of thin collector members disposed on the upstream side of said filter medium in the electrostatic field between adjacent pleats, each of said collector members being formed of a thin plate of dielectric material arranged within the space between adjacent pleats and having its sides disposed approximately parallel with the direction of flow of said gas stream, said plate having its leading edge extending upstream beyond the plane of said electrodes and its trailing edge extending downstream beyond said electrodes, a porous fibrous material enveloping said plate, a plurality of projections on the sides of said plate for maintaining an air space between the sides of said plate and said fibrous material, said thin plate having a plurality of holes therein to permit flow of a small amount of air from one side of said plate to the other whereby particles influenced by said electrostatic field are collected and retained on said sheet of porous, fibrous material wrapped around said plate.

References Cited in the file of this patent

UNITED STATES PATENTS

| 2,814,355 | Powers | Nov. 26, 1957 |

FOREIGN PATENTS

| 337,490 | Germany | June 9, 1921 |